L. M. ELLISON.
DRAFT GAGE.
APPLICATION FILED MAY 13, 1915.

1,184,730.

Patented May 30, 1916.

Witnesses:
W. H. Cotton
R. Ringh

Inventor:
Lewis M. Ellison
By Gillson & Gillson Attys.

UNITED STATES PATENT OFFICE.

LEWIS M. ELLISON, OF CHICAGO, ILLINOIS.

DRAFT-GAGE.

1,184,730.  Specification of Letters Patent.  Patented May 30, 1916.

Application filed May 13, 1915. Serial No. 27,788.

*To all whom it may concern:*

Be it known that I, LEWIS M. ELLISON, a citizen of the United States, and resident of Chicago, county of Cook, and State of Illinois, have invented certain new and useful Improvements in Draft-Gages, of which the following is a specification and which are illustrated in the accompanying drawings, forming a part thereof.

The invention relates to instruments for determining fluid pressures and more particularly to those which are especially adapted for determining the pressures existing in different parts of the chamber of a steam boiler furnace or the variation in pressure between such parts.

The object of the invention is to provide an instrument capable of showing the pressures existing at several places or the differences in the pressure existing in separated parts of a steam boiler furnace upon a single scale.

To this end the invention contemplates a draft gage having a single scale tube with connections between the ends of the tube and different parts of a steam boiler furnace, and means for controlling these connections for rendering the pressures existing in the different parts of the boiler furnace operable upon the scale tube in various ways.

Figure 1:
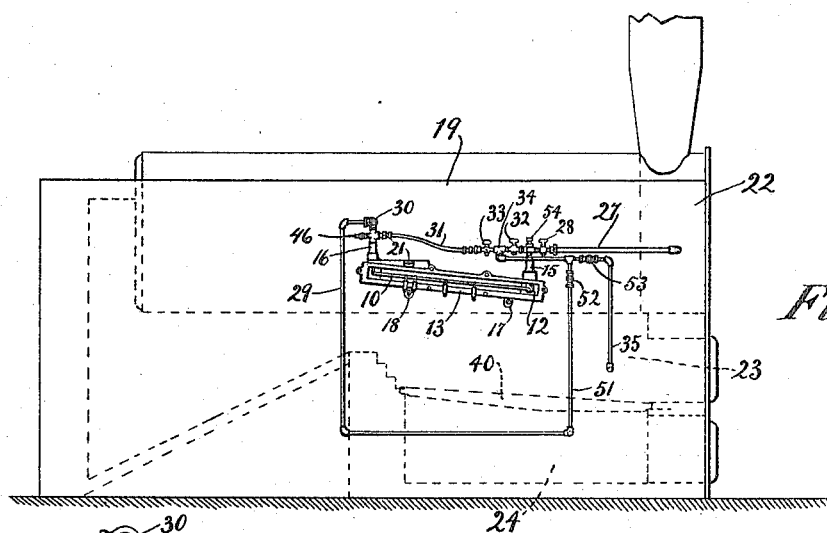
Figure 2:
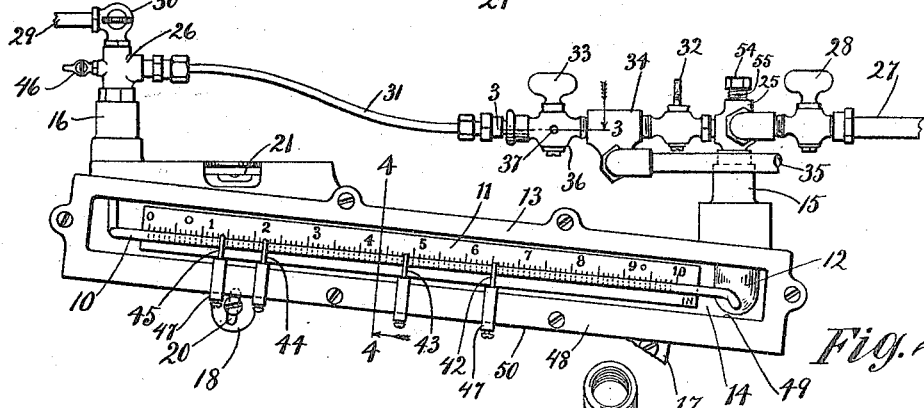
Figure 3:
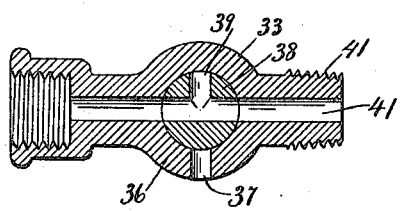
Figure 4:
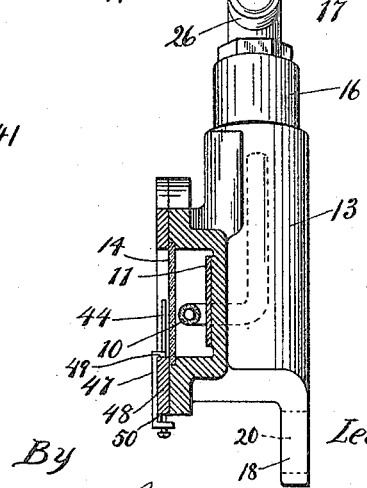

In the accompanying drawings, Figure 1 shows a draft gage embodying the features of improvement provided by the invention in front elevation, the manner in which the same is to be applied to a steam boiler furnace being illustrated by a diagrammatic representation of the furnace upon a reduced scale, Fig. 2 shows the draft gage drawn to a larger scale, in front elevation, Fig. 3 is a detail plan sectional view taken on the line 3—3 of Fig. 2, and Fig. 4 is a transverse sectional view taken on the line 4—4 of Fig. 2.

In the particular apparatus illustrated the indicator takes the form of an inclined tube 10, the same being extended over a scale 11 from the lower end of a bulb or cup 12. As is usual in devices of this kind, the bulb or cup, 12, is filled with sufficient mobile liquid, (not shown) to extend outwardly in the tube 10 to the end of the scale 11 when the same fluid pressure exists in the chamber of the bulb and at the outer end of the tube.

For convenience, the parts so far described are inclosed within a case 13 having a transparent front 14, and provided with upstanding nipples 15, 16 at its opposite ends. These nipples communicate respectively, with the chamber of the bulb or cup 12 and with the outer end of the tube 10. Bracket lugs 17, 18, are also provided upon the wall of the case 13 for the reception of screws used in attaching the same to a suitable support, as the wall of the boiler setting, 19. Preferably, one of the bracket lugs, as 18, is formed with a slotted screw receiving opening 20 to facilitate an angular adjustment of the instrument in accordance with a spirit level, shown at 21.

In carrying out the invention, provision may be made for putting the chamber of the bulb 12 into communication either with the flue chamber 22, the furnace chamber 23, or the ash pit chamber 24 of the boiler setting, as 19, and for putting the outer end of the tube 10 into communication either with the furnace chamber, as 23, the ash pit chamber, as 24, or with the atmosphere of the room in which the instrument is located. As shown, a fitting 25, 26, having a plurality of arms, is applied to each of the nipples 15, 16. When said fittings are used, a pipe 27, containing a valve 28, may be extended from the flue chamber 22 of the boiler setting to one of the arms of the fitting 25. Similarly a pipe 29 containing a valve 30 may be extended from one of the arms of the fitting 26, to the ash pit chamber 24. Other arms of the two fittings, as 25, 26, are then connected by a pipe 31. This last mentioned pipe contains two valves 32 and 33 and a T-fitting 34 is located between the valves.

Communication between either the chamber of the bulb or cup 12, or the outer end of the tube 10 and the furnace chamber 23, is permitted by connecting the exposed arm of the fitting 34 with the furnace chamber by a pipe 35. To provide for a direct communication between the outer end of the tube 10 and the atmosphere when desired, a suitable valve controlled vent is supplied. As shown, one such vent is provided by forming the casing, as 36 Fig. 3, of the valve 33 with a lateral vent opening 37, such opening being controlled by forming the plug 38 of the valve with a three-way passage 39. If desired a valve controlled vent may also be supplied by entering a pet cock 46 in the remaining arm of the fitting 26.

If the valve 28 or 32 is opened when the outer end of the tube 10 is open to the atmosphere, as by so positioning the valve 33 as to open the vent 37, or by opening the pet cock 46, the reduction of pressure in the flue chamber 22 or furnace chamber 23, as compared with that of the atmosphere, is shown upon the scale 11. Furthermore, if the valves 30 and 32, and pet cock 46 are all closed the loss of pressure between the furnace chamber 23 and flue chamber 22 may be shown upon the scale 11, by opening the valve 28 and so positioning the plug 38 of the valve 33 to provide a passage between the fittings 34 and 26. Furthermore, the loss of pressure between the ash pit chamber 24 and furnace chamber 23, that is, the resistance of the furnace grates, as 40, may be shown upon the scale 11 if the valves 30 and 32 be opened, the valve 28 and pet cock 46 being closed, and the valve 33 turned to an intermediate position in which both the vent opening 37 and the passage, as 41, through the valve are closed.

If desired, adjustable pointers, as 42, 43, 44 and 45 may be mounted upon the case 13 to extend in front of the transparent opening 14 for indicating the ranges through which the readings on the scale should be retained for the most economical operation of the steam boiler furnace. I have shown four of such pointers arranged along the case in front of the scale 11. Each of these pointers is fixedly mounted upon a clamp 47. These clamps are adapted to embrace the rim 48 of the case 13, between a shoulder 49, extending along the lower edge of the transparent front 14, and the lower margin 50 of the rim 48. The difference between the pressures existing in the furnace and flue chambers, as 23 and 22, will usually be shown near the outer end of the scale 11. The pointers 44 and 45 are accordingly located a suitable distance apart near that end of the scale for showing the permissible variations in this reading for an economical operation of the furnace. Similarly the pressure existing in the furnace chamber 23, as compared with that of the atmosphere will properly be shown at about the midlength of the scale. The pointers 42 and 43 are accordingly positioned near this point. No pointers are shown for indicating the desirable readings for the loss of pressure between the furnaces and ash pit chambers or the pressure existing in the flue chamber.

When natural draft is employed it is sometimes desirable to provide a connection between the ash pit chamber 24 and the lower end of the scale tube 10. For this purpose the pipe 35 is provided with a branch 51 leading to the ash pit chamber 24 and valves 52 and 53 are located in the branch 51 and in the pipe 35 beyond the branch from the fitting 34, respectively. An additional means of opening the chamber of the cup 12 to the atmosphere may be provided by closing one arm of the fitting 25 by a threaded plug 54 having a lateral vent 55. The vent 55 is opened by partially unscrewing the plug 54. While the pipe 27 is shown as leading to the flue chamber 22 adjacent the end of the boiler setting 19, it will be understood that if desired the pipe may lead to any intermediate part of the flue passage.

When the scale 11 reads inwardly from the outer or higher end of the inclined tube 10, as shown, the chamber at which the lesser of the two pressures to be compared, exists, is always to be connected with the bulb or cup 12. Since, under natural draft the pressure existing in the ash pit chamber 24, furnace chamber 23 and flue chamber 22 will all be less than the atmosphere, provision is made for connecting each of these chambers with the nipple 15. Furthermore, to permit the pressures existing in the ash pit chamber 24 and furnace chamber 23 to be each compared with the lesser pressure existing in the flue chamber 22, connections are provided from both the ash pit chamber 24 and furnace chamber 23 to the nipple 16, while the flue chamber 22 requires a connection with the nipple 15 only. When forced draft is employed the pressure above the atmosphere existing in the ash pit chamber 24 may be indicated on the scale 11 by connecting the ash pit chamber with the nipple 16 and opening the nipple 15 to the atmosphere. For this purpose, the valve 30 will be opened, the valves 28, 32, 33 and cock 46 closed and the screw plug 54 turned back to expose the vent 55.

I claim as my invention,—

1. In a furnace draft gage, in combination, a scale tube, a pair of pipes for connection with different parts to be tested, connections between one of the pipes and both ends of the tube, one of the said connections being vented, a connection between the other pipe and the end of the tube not having the said vented connection with the first separately mentioned pipe, and valves controlling the said connections and the vent.

2. In a furnace draft gage, in combination, a scale tube, a pipe connecting the ends of the tube, a pair of separated valves in the pipe, a vent constructed to be opened to the adjacent end of the scale tube by the closing of one of the said valves, valve controlled means for connecting the other end of the scale tube with a part to be tested, and means for connecting the part of the pipe between the valves of the first mentioned pair with a different part to be tested.

3. In a furnace draft gage, in combination, a scale tube, three pipes to lead from different parts of the furnace to be tested, connections between one of the pipes and both ends of the scale tube, one of the said connections being vented, a connection between each end of the scale tube and one of the remaining pipes, and valves controlling all of the said connections and the vent.

4. In a furnace draft gage, in combination, a scale tube, three pipes to lead from different parts of the furnace to be tested, connections between two of the pipes and both ends of the scale tube, the connection between each of the said pipes and one end of the scale tube being vented, a connection between the remaining pipe and the other end of the scale tube, and valves controlling all of the said connections and the vents.

LEWIS M. ELLISON.

Witnesses:
CHARLES B. GILLSON,
R. RINGLE.

Copies of this patent may be obtained for five cents each, by addressing the "Commissioner of Patents, Washington, D. C."